United States Patent Office 3,778,513
Patented Dec. 11, 1973

3,778,513
PROCESS FOR PREPARING MEAT EXTRACT-LIKE SEASONING
Akio Shiga and Kengo Ishida, Machida, Japan, assignors to Kyowa Hakko Kogyo Co., Ltd., Tokyo, Japan
No Drawing. Continuation-in-part of abandoned application Ser. No. 754,964, Aug. 23, 1968. This application Dec. 20, 1971, Ser. No. 210,101
Claims priority, application Japan, Aug. 25, 1967, 42/54,204
Int. Cl. A23l 1/26
U.S. Cl. 426—7                                          14 Claims

ABSTRACT OF THE DISCLOSURE

A process for preparing a meat extract-like seasoning by subjecting the cells of a yeast, bacterium, mold or ray fungus to enzyme or acid decomposition to form an amino acid-peptide mixture having an average peptide length of about 4 to 5 units, adding to the mixture saccharides, organic acids, and/or salts of these acids, 5'-nucleotide and nucleosides, and gelatin and/or sodium alginate, and reacting the resultant mixture at an elevated temperature.

---

This is a continuation-in-part of copending U.S. patent application Ser. No. 754,964, filed on Aug. 23, 1968, now abandoned by the inventors herein.

The present invention relates to a process for preparing seasonings having a meat extract-like flavor by decomposing to a suitable extent a vegetable protein or cell of a yeast, bacterium or mold or ray fungus with an enzyme or acid to form an amino acid-containing peptide mixture composed mainly of peptide, adding to the mixture effective amounts of saccharides, organic acids, and/or salts of these acids, 5'-nucleotides and nucleosides, and gelatin and/or sodium alginate and then reacting the mixture at an elevated temperature.

Meat extracts characteristically contain large quantities of anserine, carnosine and like peptides. These peptides play important roles in the development of the complex tastes of the resulting seasonings. It is well known that a meat-like flavor is generated by the amino-carbonyl reaction of a saccharide, an amino acid and a peptide. A brown product produced in the above case contains various carbonyl compounds, mainly aldehydes, and develops a characteristic flavor. Furthermore, in the case of meat extracts, organic acids and/or salts of these acids, 5'-nucleotides and nucleosides also play important roles in the generation of flavor.

One of the objects of the present invention is to provide an improved process for the preparation of meat extract-like seasonings.

Another object of the present invention is to produce a meat extract-like seasoning which is substantially indistinguishable from meat extracts and is an excellent seasoning substitute for meat extracts.

A further object of the present invention is to provide an improved process for producing meat extract-like seasonings which are excellent in quality.

Other objects and further scope of applicability of the present invention will become apparent from the detailed description given hereinafter; it should be understood, however, that the detailed description and specific examples, while indicating preferred embodiments of the present invention, are given by way of illustration only, since various changes and modifications within the spirit and scope of the invention will become apparent to those skilled in the art from this detailed description.

Pursuant to the present invention, it has been found that a much improved product and process for producing meat extract-like seasonings may be obtained by first subjecting various proteins to enzyme decomposition or acid decomposition to form an amino acid-containing peptide mixture composed mainly of peptides having an average peptide length of about 4 to 5 units. In the case of glycoprotein, a mixture comprising saccharide, glycopeptide, peptide and amino acid is formed. The thus formed mixture is used as a base for the present seasoning. To the mixture are added effective amounts of saccharides, organic acids and/or salts of these acids, 5'-nucleotides and nucleosides, and gelatin and/or sodium alginate. Subsequently, the mixture is heated and reacted for a definite period of time at a given pH, temperature and water content conditions to produce the seasoning of the present invention.

In the process of the present invention, the following aspects of the present process are significant:

(1) The composition of the protein decomposate,
(2) The particular components, that is saccharides, organic acids and/or salts of these acids, 5'-nucleotides and nucleosides, and gelatin and/or sodium alginate, added in the process, and
(3) The proportions of the individual components used and the reaction conditions adopted.

In the case of seasonings of this kind, the harmony and balance of taste are important. Thus, the particular components and the amounts thereof should be well harmonized. In order to form these components into a mild, natural and harmonized seasoning, the mixture thereof is heated and reacted to generate a meat extract-like flavor.

The process of the present invention, as illustrated below, can be divided into three steps.

The first step is that of forming a peptide mixture by decomposing a starting protein by the action of an enzyme and/or acid. This step is carried out in the following manner. To the starting protein about 0.1 to 0.5% of protease is added to effect enzyme decomposition, and the reaction is stopped when a desired peptide mixture is formed. In the case of a crude starting material containing cell walls and the like, about 0.5 to 1 N hydrochloric acid is added in an amount of about 3 to 6 times the amount (v./w.) of the starting material, and the mixture is treated at a temperature of about 100 to 130° C. for about 1 to 5 hours to decompose the cell walls, to liberate the saccharides constituting the cell walls and to extract the cell protein. Subsequently, the decomposate is neutralized and the extracted protein is decomposed by the aforesaid protease to form a sugar and amino acid-containing peptide mixture composed mainly of peptides. Alternately, peptides obtained from various different starting materials may be mixed together to form a mixture having a desired composition. The average peptide length (hereinafter referred to as "A.P.L.") of the thus formed peptide mixture should be adjusted to a length of about 4 to 5 units. The A.P.L. value can be calculated according to the formula T—N/NH$_2$—N, wherein T—N represents the content of total nitrogen and NH$_2$—N represents the content of amino nitrogen. Furthermore, in the composition, the ratio of free amino acid to peptides should be about 1 to about 4 to 5. The above requirements are conditions necessary for the development of the tasty flavor of the product as a meat extract-like seasoning.

The second step of the process of the present invention is that of adding various components to the peptide mixture formed in the first step so that the amount of peptide mixture becomes about 60 to 70% of the total components of the final product (calculated for dry product). Examples of saccharides which can be added in the process of the present invention include one or more of hexose, pentose, disaccharides, hexose monophosphate, pentose monophosphate, and sugar alcohols. Advantageously, the saccharides are present in an amount of about 2 to 9% by weight, based on the total solid present. In the case glycoprotein is used as the starting material in the first step, free saccharide is formed and therefore only a small amount, which normally would be an insufficient portion, need be supplemented or, in some cases, the addition of saccharides may be omitted. As organic acids and/or salts of these acids there are added about 3 to 10% based on the weight of the total solid of, for example, one or more members selected from the group consisting of malic acid, succinic acid, glycolic acid, citric acid, lactic acid, fumaric acid and salts thereof. As 5'-nucleotides, there are added about 0.2 to 2.5%, based on the weight of the total solid, of at least one member of the group consisting of 5'-inosinic acid, 5'-guanylic acid, 5'-xanthylic acid and the like, and salts thereof. The nucleosides which are added during the process of the present invention include guanosine, inosine, adenosine, xanthosine and the like. Advantageously, the nucleosides are present in an amount of about 0.1 to 1% by weight based on the weight of the total solid. Furthermore, about 0.1 to 1% by weight, based on the weight of the total solid, of gelatin and/or sodium alginate is added in the process of the present invention. By the incorporation of the above components, a harmonized meat extract-like seasoning having a complex taste can be effectively prepared.

In the third step of the process of the present invention, the water content of the mixture obtained in the second step is controlled to about 15 to 85%, and the pH thereof is adjusted to about 5 to 7 by the addition of a basic material, for example sodium carbonate or caustic soda or by the addition of a mineral acid such as for example hydrochloric acid. The mixture is then heated and reacted at a temperature of about 50 to 80° C. for about 0.5 to 5 hours with stirring in the open at atmospheric pressure. In this step, an amino-carbonyl reaction takes place to produce various flavors derived primarily from the carbonyl compounds. Furthermore, a browning reaction progresses to form Elson-Morgan reaction-position substances, whereby a meat extract-like flavor is produced. In this step, the individual components are aged and harmonized, whereby the mixture develops a mild taste. After completion of the above reaction, the reaction mixture is adjusted to a pH of about 5.5 to 6.5 to prepare a paste or powdery seasoning.

The following examples are given merely as illustrative of the present invention and are not to be considered as limiting. Unless otherwise noted, the percentages therein are by weight.

EXAMPLE 1

To 100 kg. of a dry cell of *Corynebacterium glutamicum* syn. (*Micrococcus glutamicus*) ATCC 13761 which has been isolated and dried after completion of a glutamic acid fermentation, is added water to make the substrate concentration 10%. Subsequently, the suspension is adjusted to a pH of 7.2 and is charged with 300 g. of "Prozyme" (trade name for a protease produced by Kyowa Hakko Kogyo Co. Ltd.), and enzyme decomposition is effected at a temperature of 45–47° C. for 14 hours. In this step, the protein is decomposed to form a peptide-amino acid mixture. The decomposate suspension is adjusted to a pH of 5.5 by adding 4 N HCl and is then subjected to centrifugation to separate and remove the undecomposed materials. Thereafter, the supernatant is charged with 5 kg. of active carbon (Taiko Zinc Chloride Carbon S-A wet 50%, produced by Futamura Kagaku Kogyo K.K.), is treated at 60° C. for 1 hour, and is then filtered to remove the active carbon. This active carbon treatment is effected in order to harmonize the taste of the resulting product. The filtrate has an A.P.L. of 4.5, contains 50 kg. of peptide, 11 kg. of amino acid, 4 kg. of arabinose, mannose and glucose, and various inorganic salts, and has a total solid content of 80 kg. To this filtrate are added 1 kg. of sodium malate, 0.5 kg. of sodium succinate, 1 kg. of sodium glycolate and 1.5 kg. of sodium lactate as organic acids; 1.2 kg. of sodium 5'-inosinate as 5'-nucleotide; 3 kg. of glucose and 0.5 kg. of sorbitol as saccharides; 0.2 kg. of gelatin; and 0.2 kg. of inosine as nucleoside. After dissolving the additives in the filtrate, the solution is adjusted to a pH of 6.5 by the addition of sodium carbonate, and is concentrated under reduced pressure at 35°–45° C. to a total solids content of 80%. The concentrate is heated at 60° C. for 4 hours with stirring in the open at atmospheric pressure. In this step, a meat flavor is generated and, at the same time, aging and harmonization achieved. Furthermore, water is vaporized, and 100 kg. of a meat extract-like seasoning having a total solid content of 85% and containing 12% of sodium chloride and the above-mentioned various components are produced. This seasoning is formed into soup B having the composition shown in Table 1, and the soup is subjected to a sensory test according to the paired preference test, using a panel composed of 31 experts, to distinguish said soup from soup A, to which has been added an equal amount of a meat extract. The results are shown in Table 2.

TABLE 1

Composition of soup A

| | Percent |
|---|---|
| Meat extract [1] | 0.2 |
| Sodium chloride | 0.8 |
| Sugar | 0.5 |
| Sodium glutamate | 0.3 |
| H.P.P. [2] | 0.3 |
| Sodium inosinate | 0.01 |
| Sodium succinate | 0.01 |
| Carrot powder | 0.01 |
| Onion salt | 0.03 |
| Garlic salt | 0.01 |
| Curry powder | 0.01 |
| Beef tallow | 0.1 |

[1] In soup B, 0.2% of the meat extract-like seasoning of this example is used in place of the meat extract.
[2] An amino acid mixture resulting from hydrolyzed plant protein.

TABLE 2

Results of organoleptic tests

| | Members |
|---|---|
| Those who preferred soup A | 16 |
| Those who preferred soup B | 15 |
| Significance | None |

From the above results, it is confirmed that the seasoning in accordance with the present invention is entirely indistinguishable from meat extracts and is an excellent seasoning substitutable for meat extracts.

EXAMPLE 2

90 kg. of wheat protein is ground and is suspended in water to a substrate concentration of 10%, and the suspension is adjusted to a pH of 7.2. The suspension is charged with 0.2 kg. of the protease "Prozyme," is subjected to enzyme treatment at 45°–47° C. for 1 hour and is then filtered free from disagreeable taste, bitter taste and the like. This filtrate contains 55 kg. of a peptide mixture having an A.P.L. of 5.5. On the other hand, 15 kg. of wheat protein is hydrolyzed with 45 l. of 3 N hydrochloric acid at 120° C. for 3 hours. Water is added to the hydrolyzate to make the substrate concentration 10%. Thereafter, vaporization and concentration are repeated to remove one-half of the hydrochloric acid. Subsequently, the liquor is adjusted to a pH of 4.5 by means of caustic soda and is charged with 0.7 kg. of the aforesaid active carbon. The mixture is treated at 60° C. for 1 hour and is then filtered to obtain a filtrate. This filtrate contains 12 kg. of an amino acid mixture having an A.P.L. of 1.1. The filtrate is mixed with the aforesaid wheat protein enzyme decomposate to obtain a peptide mixture having an A.P.L. of 4.6 and containing 55 kg. of peptide and 12 kg. of free amino acid. To this mixed liquor are added 3 kg. of glucose and 0.5 kg. of sorbitol as saccharides; 2 kg. of sodium malate, 0.6 kg. of sodium succinate and 1 kg. of sodium citrate as organic acids; 0.5 kg. of sodium 5′-guanylate as 5′-nucleotide; 0.2 kg. of inosine; and 0.2 kg. of gelatin. After dissolving the additives in said mixed liquor, the solution is neutralized to a pH of 6.5 by means of sodium carbonate, and is concentrated under reduced pressure to a total solids content of 55%. The concentrate is heated at 65° C. for 3 hours with stirring in the open at atmospheric pressure and is powderized by the use of a spray-dryer to obtain 98 kg. of a powdery seasoning. This seasoning contains 14% sodium chloride, 6% sodium glutamate, 0.5% of sodium 5′-guanylate, and like organic acids, and brown products, and is an excellent seasoning having a meat extract-like flavor.

EXAMPLE 3

To 100 kg. of "Soymilk" (trade name for a soybean protein concentrate produced by Honen Seiyu Kogyo Co. Ltd.), 200 l. of 0.5 N hydrochloric acid is added, and the mixture is hydrolyzed at 130° C. for 3 hours. In this step, part of the protein in the starting material is decomposed and, at the same time, the saccharide portion is decomposed to free saccharides. After cooling, the hydrolyzate is neutralized to a pH of 7.2 by means of caustic soda or sodium carbonate, and water is added to make 1000 l. Subsequently, the suspension is charged with 0.15 kg. of "Prozyme B" (trade name for a protease produced by Kyowa Hakko Kogyo Co. Ltd.) and enzyme decomposition is effected at 45–47° C. for 16 hours. By thus effecting the acid decomposition in combination with the enzyme decomposition, a peptide mixture having an A.P.L. of 4.0 is obtained. After completion of the enzyme decomposition, thus suspension is adjusted to a pH of 6.5 by means of hydrochloric acid and is then centrifuged to obtain 800 l. of a transparent decomposate liquor. To this liquor is added 4 kg. of the active carbon used in Example 1, and the mixture is treated at 60° C. for 2 hours and is then filtered to obtain 780 l. of a filtrate free from bitter taste. This filtrate has a total solids content of 74 kg. and contains 11 kg. of amino acid, 46 kg. of peptide, 4 kg. of such saccharides as mannose, arabinose, glucose, and the like, and 10.5 kg. of sodium chloride.

To this decomposate are added 3 kg. of sodium malate, 4 kg. of sodium lactate, 0.5 kg. of sodium succinate, 1.2 kg. of sodium 5′-inosinate, 0.15 kg. of inosine, 0.15 kg. of gelatin and 0.15 kg. of sodium alginate. After confirming that the pH is 6.5, the mixture is concentrated under reduced pressure at 40°–45° C. to obtain a concentrate having a total solids content of 80%. Subsequently, the concentrate is heated at 60° C. for 2.5 hours with stirring in the open at atmospheric pressure. In this step, a meat flavor is generated. In the above manner, 103 kg. of a meat extract-like seasoning having a total solids content of 83% is obtained. This seasoning contains 2.8% of sodium glutamate, 1.16% of sodium inosinate, 10% of sodium chloride and like organic acids, saccharides, and peptides, and is an excellent seasoning having a meat extract-like flavor.

EXAMPLE 4

To 100 kg. of dry cells of *Corynebacterium glutamicum* ATCC 13716 was added 300 l. of 1 N-hydrochloric acid, and the cells were hydrolyzed at 120° C. for 2 hours. Subsequently, the suspension containing the hydrolyzed cells was adjusted to a pH of 7.5 and was charged with 200 g. of aforesaid "Prozyme" and enzyme decomposition was effected at 40° C. for 8 hours with stirring. The decomposate suspension was adjusted to a pH of 5.7 by adding 4 N-hydrochloric acid and was heated at 90° C. for 10 minutes to deactivate the enzyme used, and was then filtered by the filter press to obtain 800 l. of filtrate. The filtrate had an A.P.L. of 4.1. To this filtrate was added 7 kg. of aforesaid carbon and the mixture was stirred at 60° C. for 1 hour and was filtered to obtain a decolored filtrate. The filtrate was concentrated under reduced pressure to obtain 130 kg. of concentrated solution containing a total solid content of 60% by weight. The concentrated solution contains 54 kg. of peptide, 13 kg. of amino acid and 3 kg. of such saccharides as arabinose, glucose and mannose, and the like. To the concentrated solution were added 2 kg. of glucose, 0.4 kg. of xylose, 2 kg. of sodium lactate, 0.5 kg. of sodium succinate, 0.4 kg. of sodium 5′-inosinate, 0.4 kg. of sodium 5′-guanylate, 0.1 kg. of guanosine, 0.1 kg. of inosine, 0.2 kg. of gelatin and 0.2 kg. of sodium alginate. Subsequently, the mixture was adjusted to a pH of 6.2 by adding 4 N-sodium hydroxide solution, and was then heated at 70° C. for 4 hours with stirring in the open. As the result, 120 kg. of a paste-like seasoning containing 84 kg. of a total solid content was obtained. The seasoning had an excellent beef-like flavor.

Since modifications of this invention will be apparent to those skilled in the art, it is not desired to limit the invention to the exact constitution shown and described. Accordingly, all suitable modifications and equivalents may be resorted to, which fall within the scope of the following claims.

What is claimed is:

1. A process for preparing a meat extract-like seasoning which comprises subjecting the cells of a yeast, bacterium, mold or ray fungus to decomposition to form an amino acid-peptide mixture having an average peptide length of about 4 to 5 units, adding to said mixture saccharides, organic acids and/or salts of these acids, 5′-nucleotides and nucleosides, and gelatin and/or sodium alginate, controlling the water content to about 15 to 85%, and adjusting the pH thereof to about 5 to 7, and reacting the resultant mixture at a temperature of about 50–80° C. for about 0.5 to 5 hours.

2. The process of claim 1, wherein the ratio of free amino acid to peptide in the composition is about 1 to about 4 to 5.

3. The process of claim 1, wherein the saccharides are at least one member selected from the group consisting of hexose, hexose monophosphate, pentose, pentose monophosphate, disaccharides, and sugar alcohols.

4. The process of claim 1, wherein the organic acids and/or salts of these acids are at least one member selected from the group consisting of malic acid, succinic acid, glycolic acid, citric acid, lactic acid, fumaric acid and salts thereof.

5. The process of claim 1, wherein the 5′-nucleotides are at least one member selected from the group consisting of 5′-inosinic acid, 5′-guanylic acid, 5′-xanthylic acid and salts thereof.

6. The process of claim 1, wherein the nucleosides are at least one member selected from the group consisting of guanosine, inosine, adenosine and xanthosine.

7. The process of claim 1, wherein decomposition is effected by the addition of at least one member selected from the group consisting of an enzyme and an acid.

8. The process of claim 7, wherein 0.1 to 0.5% of enzyme is added to effect enzyme decomposition.

9. The process of claim 7, wherein about 3 to 6 times the amount (v./w.) of the starting material, of about 0.5 to 1 N hydrochloric acid is added at a temperature of about 100–130° C. to effect acid decomposition.

10. A process for producing a meat extract-like seasoning which comprises subjecting the cells of a yeast, bacterium, or fungus to enzyme, to acid, or to enzyme-acid decomposition to form an amino acid-peptide mixture having an average peptide length of about 4 to 5 units, adjusting the saccharide content of said mixture to an amount of 2 to 9% when the mixture has a saccharide content outside of said range, about 3 to 10% of organic acid and/or salts of these acids, about 0.2 to 2.5% of 5′-nucleotides, about 0.1 to 1% of nucleosides, and about 0.1 to 1% of gelatin or sodium alginate or mixtures thereof, the percentages being based upon the total weight of solid until the peptide mixture content becomes about 60 to 70% of the total solid of the final product, calculated on a dry product basis controlling the water content to about 15 to 85% and adjusting the pH thereof to about 5 to 7, and reacting the resultant mixture at a temperature of about 50 to 80° C. for about 0.5 to 5 hours.

11. The process of claim 10, wherein the cells are derived from the microorganism *Micrococcus glutamicus* ATCC 13761.

12. A meat extract-like seasoning prepared in accordance with the process of claim 10.

13. The process of claim 10, wherein after completion of the reaction, the reaction mixture is adjusted to a pH of about 5.5 to 6.5 to prepare a paste or powdery seasoning.

14. The process of claim 13, wherein the saccharides are selected from the group consisting of hexose, hexose monophosphate, pentose, pentose monophosphate, disaccharides, sugar alcohols and mixtures thereof, the organic acids and/or salts of these acids are selected from the group consisting of malic acid, succinic acid, glycolic acid, citric acid, lactic acid, fumaric acid, salts of these acids and mixtures thereof, the 5'-nucleotides are selected from the group consisting of 5'-inosinic acid, 5'-guanylic acid, 5'-xanthylic acid, salts of these 5'-nucleotides and mixtures thereof, and the nucleosides are selected from the group consisting of guanosine, inosine, adenosine, xanthosine and mixtures thereof.

References Cited

UNITED STATES PATENTS

| | | | |
|---|---|---|---|
| 2,934,436 | 4/1960 | May | 99—110 X |
| 3,523,801 | 8/1970 | Shiga | 195—29 X |
| 3,645,753 | 2/1972 | Gasser | 99—140 R |
| 3,681,195 | 8/1972 | Suekane | 195—4 |
| 2,934,437 | 4/1960 | Morton et al. | 99—140 |
| 3,394,017 | 7/1968 | Giacino | 99—140 |
| 3,480,447 | 11/1969 | Hack et al. | 99—140 |
| 3,493,395 | 2/1970 | Soeters | 99—140 |
| 3,268,412 | 8/1966 | Champagnat et al. | 99—14 X |
| 2,887,387 | 5/1959 | Rusoff | 99—140 |

OTHER REFERENCES

Batzer et al.: "Identification of Some Beef Flavor Precursors," Ag. & Fd. Chem., vol. 10, No. 2, March-April (1962), pp. 94–96.

MORRIS O. WOLK, Primary Examiner

S. MARANTZ, Assistant Examiner

U.S. Cl. X.R.

195—4, 29; 260—112.5, 117, 211.5 R; 426—60, 65, 212, 221, 229